United States Patent
Yoneda et al.

(10) Patent No.: US 7,159,124 B2
(45) Date of Patent: Jan. 2, 2007

(54) NON-VOLATILE SEMICONDUCTOR MEMORY THAT PREVENTS UNAUTHORIZED READING

(75) Inventors: Takayuki Yoneda, Kawasaki (JP); Katsuhiro Miki, Aichi (JP)

(73) Assignee: Spansion LLC, Sunnyvale, CA (US)

( * ) Notice: Subject to any disclaimer, the term of this patent is extended or adjusted under 35 U.S.C. 154(b) by 547 days.

(21) Appl. No.: 10/298,512

(22) Filed: Nov. 19, 2002

(65) Prior Publication Data

US 2003/0140206 A1 Jul. 24, 2003

(30) Foreign Application Priority Data

Jan. 22, 2002 (JP) .............................. 2002-012985

(51) Int. Cl.
*G06F 12/14* (2006.01)

(52) U.S. Cl. ...................... 713/190; 713/193; 713/189; 711/163

(58) Field of Classification Search ................ 713/190, 713/193, 189
See application file for complete search history.

(56) References Cited

U.S. PATENT DOCUMENTS

| 6,910,133 | B1 * | 6/2005 | Cohn | 713/190 |
| 2002/0128911 | A1 * | 9/2002 | Furuta | 705/14 |
| 2003/0061499 | A1 * | 3/2003 | Durrant | 713/189 |

FOREIGN PATENT DOCUMENTS

JP 2002268946 A * 9/2002

* cited by examiner

*Primary Examiner*—B. James Peikari
(74) *Attorney, Agent, or Firm*—Arent Fox PLLC (57) ABSTRACT

A non-volatile includes a memory cell array for storing data, a decryption circuit for decrypting data read from the memory cell array using a prescribed computing process, and a decryption control circuit for activating the decryption circuit according to an inputted decryption command during a read operation.

20 Claims, 5 Drawing Sheets

Normal Read Operation

FIG. 6

Decryption Mode Read Operation

FIG. 7  Memory Cell Array

| SEC0 (Encrypted) |
| SEC1 |
| SEC2 (Encrypted) |
| SEC3 |

MCA

FIG. 8  Read control example

| Entry SEC0 | Read SEC0 | Exit SEC0 | Read SEC1 | Read SEC3 | Entry SEC2 | SEC2 | SEC2 |

FIG. 9

| SEC0 | SEC2 | SEC0 | SEC1 | SEC3 | SEC2 | SEC0 | SEC2 |

FIG. 10

| ENTRY | SEC0 | EXIT | SEC1 | SEC3 | ENTRY | SEC2 | EXIT |

FIG. 11

NON-VOLATILE SEMICONDUCTOR MEMORY THAT PREVENTS UNAUTHORIZED READING

BACKGROUND OF THE INVENTION

1. Field of the Invention

The present invention relates to rewritable non-volatile memory, and more particularly to non-volatile semiconductor memory that prevents unauthorized reading.

2. Description of the Related Art

Rewritable non-volatile semiconductor memory is widely used as memory for storing programs and data (hereinafter "contents"). Since the contents are retained even when the power is off, such memory is widely used in portable telephones, portable information terminals and the like.

Users who purchase non-volatile memory write contents to be stored to the memory, and then use a program-protect or erase-protect function to place the memory in a protected state so that the contents are not mistakenly erased or altered thereafter. Such a protect function can prevent the modification of stored contents.

The contents stored to memory, such as a game program, for example, have their own intrinsic value. Consequently, the unauthorized copying of such contents is undesirable. Conventional non-volatile memory, however, has the abovementioned write-protect function, but does not have a function to prohibit reading. This is because the functioning of the memory requires the stored contents to be freely read. As a result, even contents having value may be read without authorization and copied to other memory.

For example, in a game device having memory in which a game program is stored, the game program may be more valuable than the device. In such a case, if the game program is copied to other memory through unauthorized copying, it may become possible to manufacture the game device at a low cost, and damage to an authorized manufacturer may be great. Consequently, a function to prevent unauthorized reading of contents in a memory is required.

SUMMARY OF THE INVENTION

It is an object of the present invention to provide non-volatile memory that can be read only by authorized users.

It is another object of the present invention to provide memory in which unauthorized reading is prohibited.

In order to achieve the abovementioned objects, an embodiment of the present invention is directed to a non-volatile memory including a memory cell array for storing data; a decryption circuit for decrypting data read from the memory cell array using a prescribed computing process; and a decryption control circuit for activating the decryption circuit during a read operation according to an inputted decryption command.

During a write operation in the abovementioned memory, a user who is authorized to write data to the memory and then read the data may write encoded data (for example, inverted) to certain addresses of the memory and non-encoded data (for example, not inverted) to other addresses of the memory. Such an authorized user will therefore know the encoded addresses and the non-encoded addresses. Therefore, the user may input a decryption command when reading data from the encoded addresses during a read operation, thereby activating the decryption circuit stored in the device such that the decrypted data may be outputted. The user may also output the data as-is, without decryption, when reading data from a non-encoded address. As a result, normal data reading is possible. On the other hand, in the case of unauthorized reading, normal data reading is not possible because an unauthorized user does not know the addresses to which encoded data are written.

In an embodiment of the present invention, the decryption control circuit stores inputted addresses that are subject to decryption in response to a decryption command. At the time of reading, the decryption control circuit activates the decryption circuit when a read address matches an address subject to decryption, and deactivates the decryption circuit when the read address does not match the address subject to decryption. The decryption control circuit is further able to write the address subject to decryption.

In the abovementioned embodiment, the address subject to decryption, which can only be known to an authorized user, is stored by the decryption control circuit. The decryption circuit can only be activated when the address subject to decryption matches the accessed address, and only an authorized user can read data normally. With this method, the decryption control circuit can automatically control encoding and decoding if the address subject to decryption is stored at the start of, or at a prescribed time during, the read operation.

DESCRIPTION OF THE PREFERRED EMBODIMENTS

A preferred embodiment of the present invention is explained below with reference to the drawings. However, the scope of the present invention is not limited by the following embodiment and extends to the invention noted in the claims and items equivalent thereto.

Figure 1:
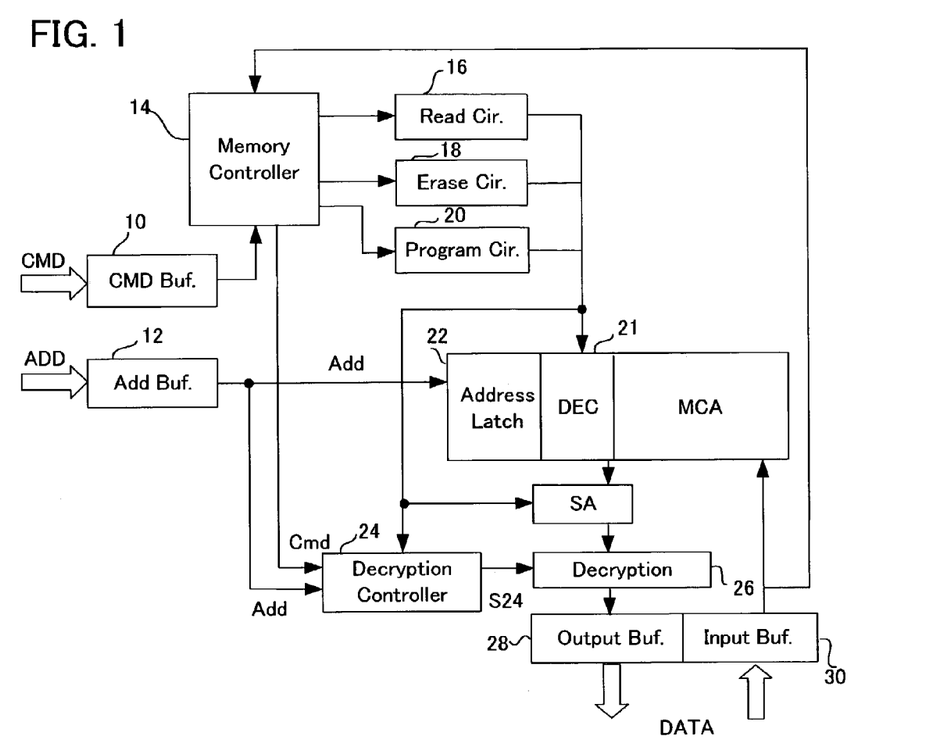
FIG. 1 is a constitutional diagram of the non-volatile semiconductor memory device according to an embodiment of the present invention.

FIG. 1 is a constitutional diagram of the non-volatile semiconductor memory device of the embodiment. The memory device of FIG. 1 includes a command buffer 10 for inputting a command signal CMD supplied from outside, an address buffer 12 for inputting an address ADD, a data input buffer 30, and a data output buffer 28. The memory device further includes a memory control circuit 14, a read circuit 16, an erase circuit 18, a program circuit 20, and a memory cell array MCA. Commands and data are supplied to the memory control circuit 14. The memory control circuit 14 decodes these commands and data and performs the necessary control of the memory. Typical control includes control of the read circuit 16, erase circuit 18, and program circuit 20, and this control is performed in response to read commands, erase commands, and program commands.

Although not shown, the memory cell array MCA is divided into a plurality of sectors and includes a plurality of non-volatile memory cells in each sector. The memory cells may be any type of memory cell that is a rewritable memory cell, wherein stored data can be retained even when power is off, such as cells having floating gates or cells having capacitors comprising ferroelectric materials. The address Add inputted by the address buffer 12 is supplied to a decoder 21 through an address latch circuit 22, and a word line and sector in the cell array are selected.

When the sector and word line in the cell array are selected, data in the memory cell is supplied to a sense amplifier SA through a bit line and detected. In the present embodiment, a decryption circuit 26 is provided between the sense amplifier SA and an output buffer 28. This decryption circuit 26 is activated or deactivated by a control signal S24 from the decryption control circuit 24.

A command Cmd from outside is supplied through the memory control circuit 14 to the decryption control circuit 24, and an address Add from outside, such as a sector address, is supplied to the decryption control circuit 24 through the address buffer 12.

During the writing of data to the memory, a user performs an encoding operation for data with a desired logic and writes the data to a sector having a certain address, then writes non-encoded data in a non-encoded state to sectors having other addresses. Consequently, the user is in a position to know which addresses have encoded data and which addresses have non-encoded data.

Figure 2:
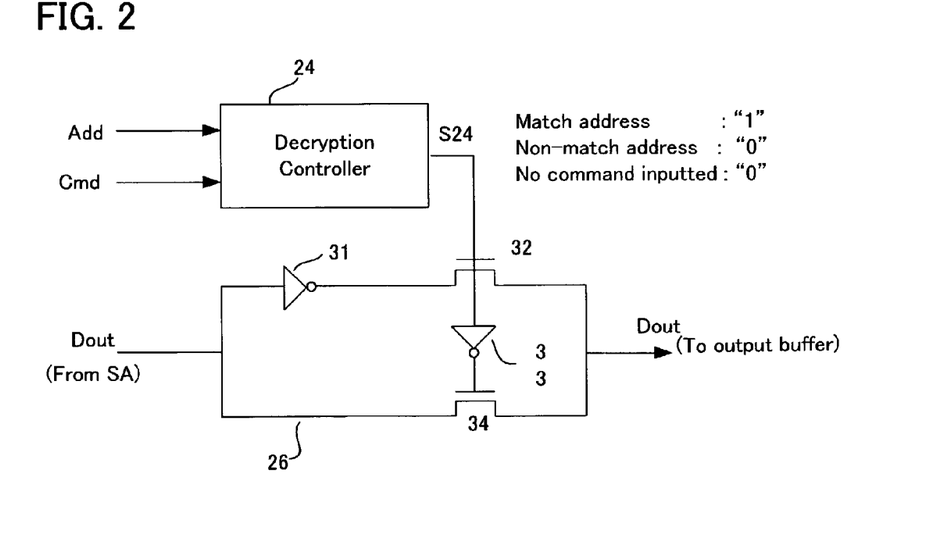
FIG. 2 is a drawing showing an example of a decryption circuit of FIG. 1.

FIG. 2 is a drawing showing an example of the decryption circuit of FIG. 1. In this example, data inversion is performed as the encoding operation when data is written to the memory cell array. Consequently, an inverter 31 is provided as a decryption operation circuit in the decryption circuit. The data Dout from the sense amplifier SA is inputted to the inverter 31 of the decryption operation circuit. The output of the inverter 31 is output to the output buffer 28 through a transistor 32 which conducts when the activation signal S24, outputted by the decryption control circuit 24, is high. Also, when the decryption activation signal S24 is low, the transistor 34 conducts and the data Dout from the sense amplifier SA is supplied to the output buffer 28 without further processing.

Figure 3:
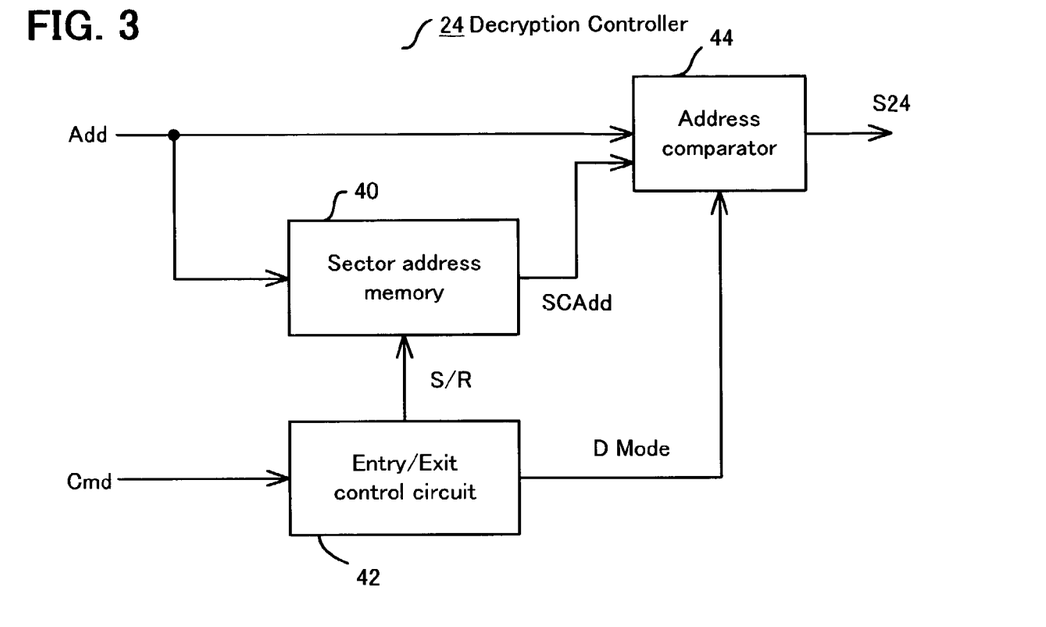
FIG. 3 is a drawing showing an example of a decryption control circuit of FIG. 1.

FIG. 3 is a drawing showing an example of the decryption control circuit of FIG. 1. The decryption control circuit 24 includes a sector address memory 40 for storing sector addresses necessary for decryption; an entry/exit control circuit 42 for controlling entry to and exit from a decryption mode; and an address comparing circuit 44 for comparing a sector address SCAdd stored in the sector address memory 40 with the sector address Add supplied from outside, and for outputting a high decryption control signal S24 when the sector address SCAdd and the sector address Add match.

When a decryption mode signal DMode generated in response to a command to enter the decryption mode is in an activated state, the address comparing circuit 44 compares the sector address SCAdd and the sector address Add, and sets the control signal S24 to a high level when the addresses match, and sets the control signal S24 to a low level when the addresses do not match. Also, the address comparing circuit 44 sets the control signal S24 to the low level regardless of the comparison of the addresses when the decryption mode signal DMode becomes deactivated in response to a command to exit from the decryption mode.

Figure 4:
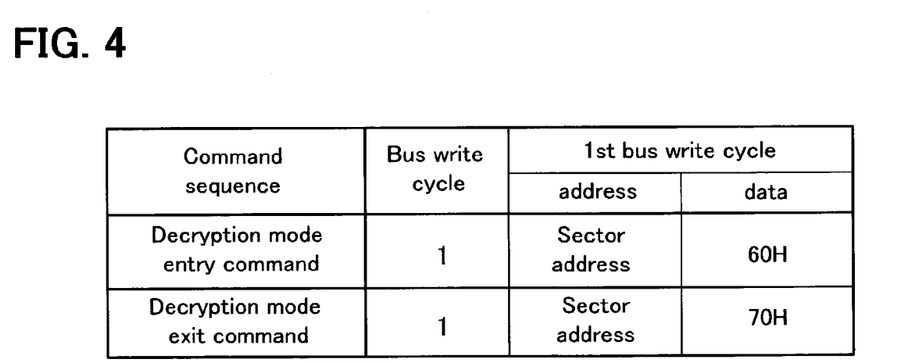
FIG. 4 is a drawing showing a relationship between a command sequence and an address and data in a corresponding write cycle according to an embodiment of the present invention.
Figure 5:
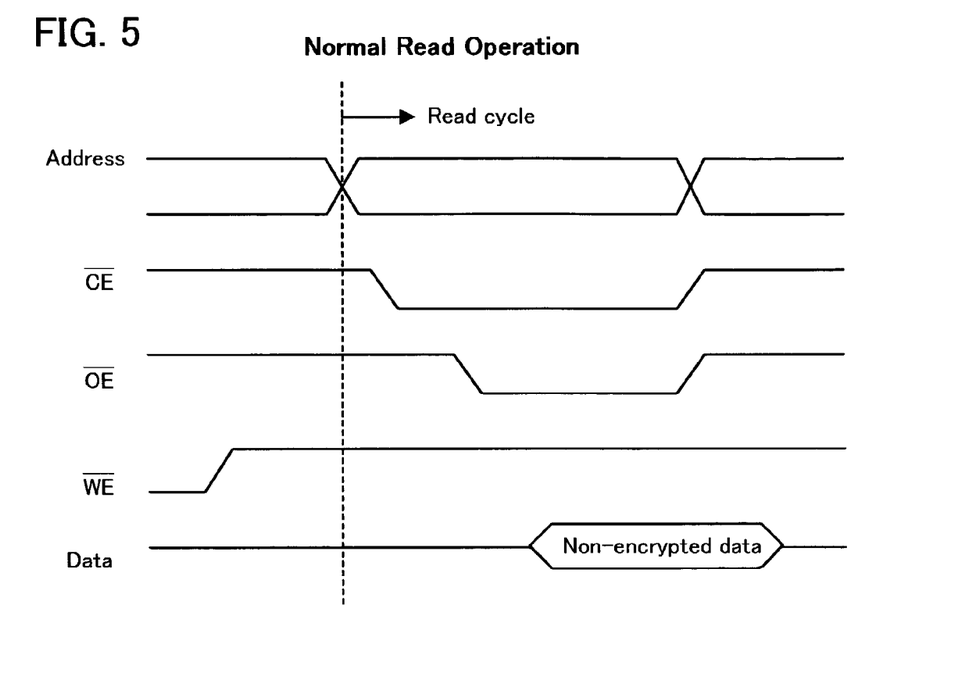
FIG. 5 is a timing chart of a normal read operation according to an embodiment of the present invention.

Operations of the decryption control circuit 24 and the decryption circuit 26 in FIGS. 2 and 3 will now be explained with reference to FIGS. 4–6. FIG. 4 is a drawing showing a relationship between a command sequence and a address and data in a corresponding write cycle. FIG. 5 is a timing chart during normal reading, and FIG. 6 is a timing chart during reading in the decryption mode.

In the normal read operation shown in FIG. 5, a write enable signal/WE enters a deactivated state (High), whereupon an address is supplied and the read cycle is entered. When a chip enable signal/CE enters an activated state (Low), the supplied address is inputted and the read operation begins. Then, when an output enable signal/OE enters an activated state (Low), data that is not encrypted is outputted from the output buffer 28. In a normal read operation, the decryption mode is not entered, and therefore, the decryption circuit 26 outputs data read from the memory cell array without decrypting the data.

Figure 6:
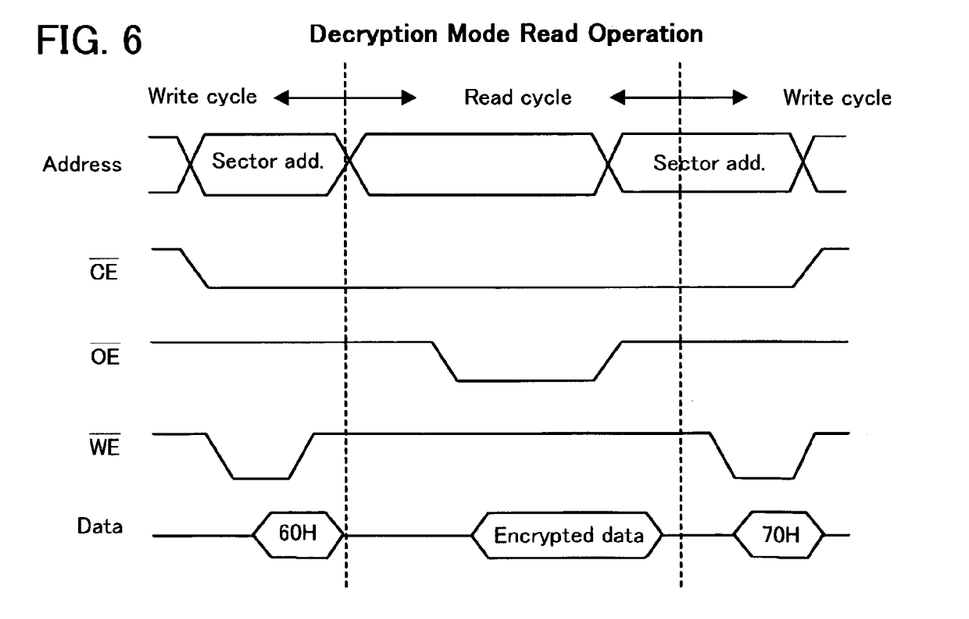
FIG. 6 is a timing chart of a read operation in a decryption mode of an embodiment of the present invention.

During a read operation in the decryption mode shown in FIG. 6, the chip enable signal/CE first enters an activated state (Low), and an address supplied from outside, such as a sector address, is downloaded. When the write enable signal/WE then enters an activated state (Low), the write cycle begins. At this time, when an entry command "60H" is inputted from a data input terminal, the memory control circuit 14 supplies the entry command to the decryption control circuit 24. In response to the entry command, the entry/exit control circuit 42 in the decryption control circuit 24 sets a set/reset signal S/R to a high level, and stores the sector address Add supplied from the outside to the sector address memory 40. The sector address memory 40 is SRAM or DRAM, for example, which can retain data only while power is on. Also, the entry/exit control circuit 42 places the decryption mode signal DMode in an activated state.

Thereafter, when the write enable signal/WE enters a deactivated state (High), the read cycle begins. An address is supplied from outside and data in the memory cell is read. The sector address Add supplied from the outside is compared, by the address comparing circuit 44, to the sector address subject to decryption, which is stored in the sector address memory 40. The decryption control signal S24 is controlled to be high when the sector address Add supplied from the outside and the sector address subject to decryption match, and low when the addresses do not match.

Accordingly, in the read operation in the decryption mode, when the input address is a sector address subject to decryption, the data which is then read is decrypted by the decryption circuit 26, i.e., inverted (in this example), and the decrypted (inverted) data is outputted. Also, when the input address is not a sector address subject to decryption, the data which is then read is outputted in a current state without being decrypted. Consequently, when an authorized user reads the data, the data can be read normally.

When the read cycle ends and the write enable signal/WE enters the activated state (Low), the write cycle begins once more. At this time, when an exit command "70H" is inputted from the data input terminal, the memory control circuit 14 supplies the exit command to the decryption control circuit 24. In response to the exit command, the entry/exit control circuit 42 in the decryption control circuit 24 sets the set/reset signal S/R to a low level, resets the sector address memory 40, automatically overwrites 0 to all memory cells, and erases the stored sector address Add. Furthermore, the decryption mode signal DMode enters the deactivated state, and the address comparing circuit 44 in the decryption control circuit 24 sets the decryption control signal S24 to a low level regardless of the input address. As a result, the memory device is caused to exit from the decryption mode.

Even when the sector address memory 40 can maintain stored addresses subject to decryption due to backup power or the like, resetting the sector address memory 40 upon exiting the decryption mode can prevent subsequent unauthorized access. Normally, the memory is controlled by a CPU and memory controller. Consequently, when a memory device containing a game program is installed in a game device, the memory device is cause to enter the decryption mode by the CPU or memory controller and the sector addresses subject to decryption are written to the memory device. Consequently, normal data reading through subsequent unauthorized access can be prevented by erasing the sector addresses subject to decryption by exiting the decryption mode.

Figure 7:
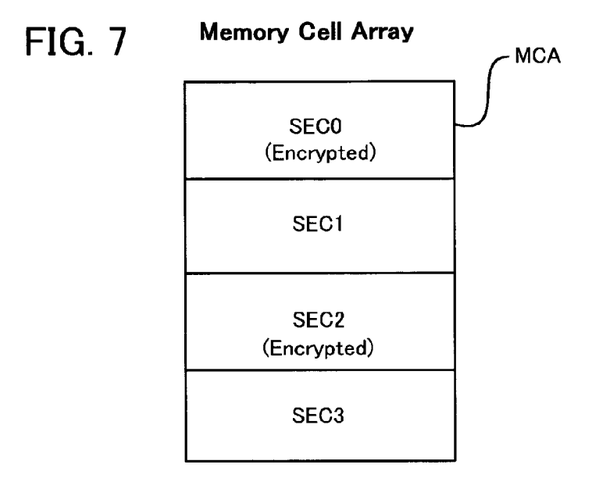
FIG. 7 is a drawing showing a structural example of a memory cell array that is subject to a read operation according to an embodiment of the present invention.

FIG. 7 is a drawing showing an example of a memory cell array MCA which is subject to a read operation according to an embodiment of the present invention. The memory cell array MCA is divided into four sectors SEC0 through SEC3. A user writes encoded data to sectors SEC0 and SEC2 in this memory cell array and writes non-encoded data to sectors SEC1 and SEC3.

Figure 8:
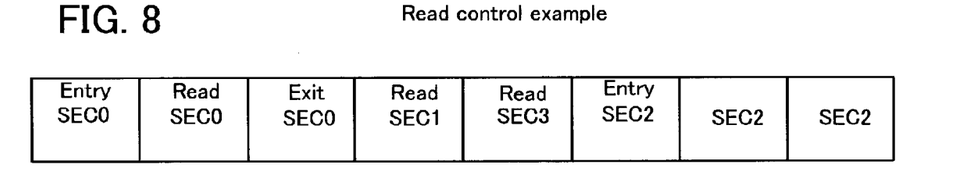
FIG. 8 is a drawing showing a first example of read operation control for the example shown in FIG. 7.
Figure 9:
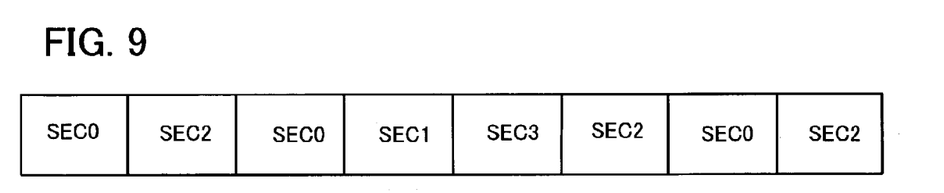
FIG. 9 is a drawing showing a second example of read operation control for the example shown in FIG. 7.
Figure 10:
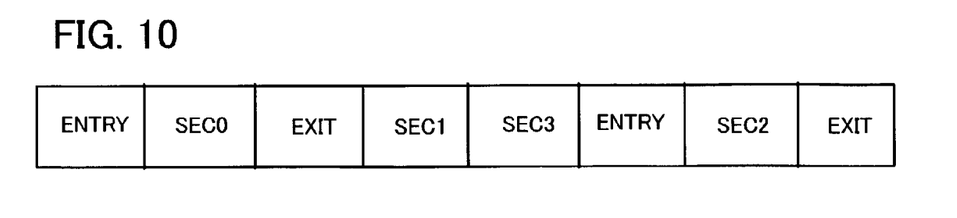
FIG. 10 is a drawing showing a third example of read operation control for the example shown in FIG. 7.

FIGS. 8, 9, and 10 are drawings showing examples of read operation control according to embodiments of the present invention for the example shown in FIG. 7. In FIGS. 8, 9, and 10, changes in the operating mode are shown with respect to time in the horizontal direction. FIGS. 8, 9, and 10 each show examples of cases in which sectors SEC0, SEC1, SEC3, and SEC2 are read in succession.

In the read control example (1) of FIG. 8, the decryption mode entry command and the address subject to decryption are inputted when reading a sector subject to decryption, the address is stored, and the decryption mode is entered. After the reading of the sector is finished, the decryption mode exit command and address subject to decryption are inputted, the address is erased, and the decryption mode is exited.

Consequently, before reading the sector SEC0 initially, the entry command and sector address are inputted, the sector address is written to the sector address memory 40, and the decryption mode is entered. After the read operation is performed for the sector SEC0, the exit command and sector address are inputted, so that the sector address is erased from the sector address memory 40, and the decryption mode is exited. Thereafter, sectors SEC1 and SEC3 are read with a normal read operation. Finally, for the sector SEC2, the entry command and sector address are inputted, the decryption mode is entered, and after the sector SEC2 is read, the exit command and sector address are inputted and the decryption mode is exited.

Because an authorized user who wrote the data to the memory knows the sectors to which encoded data was written, the decryption mode is entered before reading those sectors, and the decryption circuit is activated, so that normal data can be read. Because an unauthorized user does not know the sectors to which encoded data was written, normal data cannot be read.

In the second read control example (2) in FIG. 9, the address of the sector subject to decryption is initially stored and then all sectors are read in the decryption mode. In the decryption mode, the decryption control circuit 24 compares the stored address of the sector subject to decryption with the address supplied from outside, and the decryption control signal S24 enters the activated state (High) only when those addresses match. Therefore, as shown in FIG. 8, it is not necessary to repeat entry and exit before and after reading the sectors subject to decryption.

As shown in FIG. 9, the entry command and address of the sector SEC0 are inputted first, and then the address of the sector SEC0 is written to the sector address memory 40. The entry command and address of the sector SEC2 are then inputted and this address is also written. Thereafter, the read operation is performed for sectors SEC0, SEC1, SEC3, and SEC2 in succession. The address comparing circuit 44 in the decryption control circuit 24 activates the decryption control signal S24 and causes the decryption of the read data only when the input address matches the stored address of the sector subject to decryption. Accordingly, normal data can be read. When all read operations are complete, the exit command and sector address are each inputted, the sector address is reset, and the decryption mode is exited.

FIG. 10 shows an example of a case in which the decryption control circuit 24 does not have a sector address memory or an address comparing circuit. Specifically, the decryption control circuit 24 sets the decryption control signal S24 to an activated state (High) in response to the entry command, and sets the decryption control signal S24 to a deactivated state (Low) in response to the exit command.

Consequently, in the read control example (3) in FIG. 10, the entry command is inputted before the read operation of the sector subject to decryption, and the decryption mode is entered. In the decryption mode, all data read are decrypted by the decryption circuit and outputted. When the reading of sectors subject to decryption is ended, the exit command is inputted before the reading of sectors not subject to decryption. In response to the exit command, the decryption mode is canceled and the normal read mode is entered. Data read thereafter is output without decryption. In this case, the input of the sector address at the time of entry and exit of the decryption mode is not especially necessary.

As shown in FIG. 10, entry commands are inputted before the reading of each of the sectors SEC0 and SEC2, and exit commands are inputted once the read operation of each of the sectors SEC0 and SEC2 is complete and before the reading of each of the sectors SEC1 and SEC3, respectively.

In the read operation example (3) in FIG. 10, the sector address subject to decryption is not stored in the memory 40, which is convenient for preventing unauthorized copying. Specifically, because the authorized user must input an entry command before reading sectors subject to decryption and an exit command before reading sectors other than those subject to decryption, control during reading becomes complicated. However, because a sector address memory is not present, and therefore cannot be left in a state in which addresses subject to decryption are mistakenly stored, it is very difficult for persons attempting unauthorized access to read encrypted data normally.

In the embodiments of the invention described above, the decryption circuit 26 may perform the decryption operation for all bits of data read from the memory cell array or for only some of the bits of data read from the memory cell array. Also, it is possible to vary the location of bits for which the decryption operation is performed for each sector address subject to decryption. In such a case, the decryption entry command includes data specifying which bits are subject to decryption. Unauthorized copying is thus made more difficult.

Also, the decryption circuit 26 may include a plurality of different types of decryption operating circuits, such that any of the decryption operating circuits may be activated for an address subject to decryption. In this case, the decryption entry command includes a selection signal for selecting one of the decryption operating circuits. The corresponding decryption operating circuit is activated in response to that selection signal. Unauthorized copying is therefore made more difficult.

Figure 11:
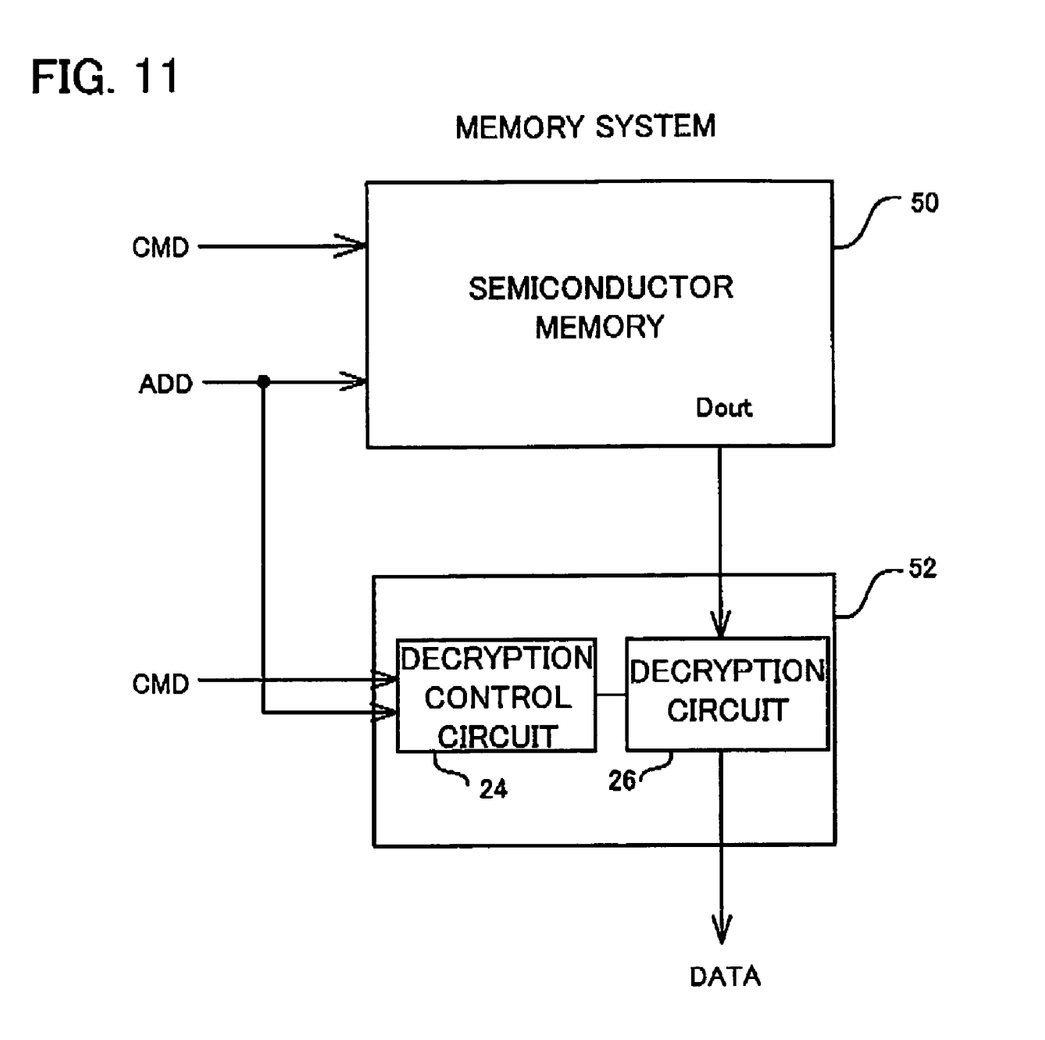
FIG. 11 is a constitutional diagram of a memory system relating to an embodiment of the present invention.

Also, in the embodiments of the invention described above, the decryption control circuit 24 and decryption circuit 26 are stored on the memory chip. However, the decryption control circuit 24 and decryption circuit 26 may also be realized on a different chip to the memory chip. In this case, these chips are used as a chip set comprising a memory device and a decryption device. FIG. 11 shows a memory system with such a chip set. In FIG. 11, data output Dout of a semiconductor memory device 50 is supplied to a decryption circuit 26 of a decryption device 52, and the output data Dout is decrypted when the decryption circuit 26 is activated by the decryption control circuit 24. The decryption control circuit 24 and decryption circuit 26 are the same as those discussed above.

According to the present invention, the unauthorized reading and copying of contents stored in non-volatile semiconductor memory may be prevented.

What is claimed is:

1. A semiconductor memory that prevents unauthorized reading, comprising:
 a memory cell array for storing data;
 a decryption circuit for decrypting data read from said memory cell array using a prescribed computing process; and
 a decryption control circuit for activating said decryption circuit according to an inputted decryption command at the time of a read operation,
 wherein said decryption control circuit stores addresses, said addresses being subject to decryption by the decryption circuit and being inputted in response to said decryption command, and further wherein, at the time of reading, said decryption control circuit activates said decryption circuit when an address for said read operation matches said address subject to decryption, and deactivates said decryption circuit when said address for said read operation and said address subject to decryption do not match.

2. The semiconductor memory according to claim 1, wherein said decryption control circuit erases said stored addresses subject to decryption in response to an exit command.

3. The semiconductor memory according to claim 1, wherein said decryption control circuit stores a plurality of addresses subject to decryption, and erases a designated decryption address in response to an exit command.

4. The semiconductor memory according to claim 1, wherein said decryption circuit decrypts data read from said memory cell array when activated, and does not decrypt data read from said memory cell array when inactive.

5. The semiconductor memory according to claim 1, wherein said decryption control circuit enters a decryption mode, in which said decryption circuit is activated, in response to said decryption command, and exits said decryption mode in response to an exit command.

6. The semiconductor memory according to claim 1, wherein said decryption circuit decrypts some bits of said read data and does not decrypt the remaining bits when activated.

7. The semiconductor memory according to claim 1, wherein said decryption circuit comprises a plurality of decryption operating circuits which, when activated, perform corresponding decryption operations according to a decryption selection signal included in the decryption command.

8. The semiconductor memory according to claim 1, wherein said decryption control circuit further comprises an entry/exit control circuit which causes the address subject to decryption to be stored in said sector address memory in response to an entry command, causes said address comparing circuit to enter a decryption mode, causes said address subject to decryption stored by said sector address memory to be erased, and causes said address comparing circuit to exit said decryption mode.

9. A semiconductor memory that prevents unauthorized reading, comprising:
 a memory cell array for storing data;
 a decryption circuit for decrypting data read from said memory cell array using a prescribed computing process; and
 a decryption control circuit for activating said decryption circuit according to an inputted decryption command at the time of a read operation, wherein said decryption control circuit comprises a sector address memory for storing inputted addresses subject to decryption by the decryption circuit, and an address comparing circuit which, at the time of reading, compares the address for said read operation with the address subject to decryption stored in said sector address memory, and activates said decryption circuit when said addresses match, and deactivates the decryption circuit when said addresses do not match.

10. The semiconductor memory according to claim 9, wherein said decryption control circuit further comprises an entry/exit control circuit which causes the address subject to decryption to be stored in said sector address memory in response to an entry command, causes said address comparing circuit to enter a decryption mode, causes said address subject to decryption stored by said sector address memory to be erased, and causes said address comparing circuit to exit said decryption mode.

11. The semiconductor memory according to claim 9, wherein said decryption control circuit erases said stored addresses subject to decryption in response to an exit command.

12. The semiconductor memory according to claim 9, wherein said decryption control circuit erases a designated decryption address in response to an exit command.

13. The semiconductor memory according to claim 9, wherein said decryption circuit decrypts data read from said memory cell array when activated, and does not decrypt data read from said memory cell array when inactive.

14. The semiconductor memory according to claim 9, wherein said decryption control circuit enters a decryption mode, in which said decryption circuit is activated, in response to said decryption command, and exits said decryption mode in response to an exit command.

15. The semiconductor memory according to claim 9, wherein said decryption circuit decrypts some bits of said read data and does not decrypt the remaining bits when activated.

16. The semiconductor memory according to claim 9, wherein said decryption circuit comprises a plurality of decryption operating circuits which, when activated, perform corresponding decryption operations according to a decryption selection signal included in the decryption command.

17. A memory system that prevents unauthorized reading, comprising:
semiconductor memory having a memory cell array for storing data;
a decryption circuit for decrypting data read from said semiconductor memory according to a prescribed computing process; and
a decryption control circuit for activating said decryption circuit in response to a decryption command at the time of a read operation, wherein, in response to said decryption command, said decryption control circuit stores inputted addresses that are subject to decryption by the decryption circuit, and, at the time of reading, activates said decryption circuit when an address for said read operation matches said address subject to decryption, and deactivates said decryption circuit when said address for said read operation and said address subject to decryption do not match.

18. The semiconductor memory according to claim 17, wherein said decryption control circuit erases said stored addresses subject to decryption in response to an exit command.

19. The semiconductor memory according to claim 17, wherein said decryption control circuit stores a plurality of addresses subject to decryption, and erases a designated decryption address in response to an exit command.

20. The semiconductor memory according to claim 17, wherein said decryption circuit decrypts data read from said memory cell array when activated, and does not decrypt data read from said memory cell array when inactive.

* * * * *